United States Patent
Grover

(10) Patent No.: US 7,478,212 B2
(45) Date of Patent: Jan. 13, 2009

(54) TECHNIQUES TO TRANSFER INFORMATION BETWEEN MEMORY REGIONS

(75) Inventor: Andrew Grover, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 204 days.

(21) Appl. No.: 11/392,197

(22) Filed: Mar. 28, 2006

(65) Prior Publication Data

US 2007/0233986 A1 Oct. 4, 2007

(51) Int. Cl.
*G06F 12/00* (2006.01)
(52) U.S. Cl. .................... 711/165; 711/112; 711/173
(58) Field of Classification Search .......... 711/165, 711/112, 173
See application file for complete search history.

(56) References Cited

U.S. PATENT DOCUMENTS 6,532,517 B1 * 3/2003 Wagner et al. ............. 711/112
2005/0223128 A1 10/2005 Vasudevan et al.

OTHER PUBLICATIONS

Bill Venners, "Java's garbage-collected heap: An Introduction to the garbage-collected heap of the Jave virtual machine", http://www.javaworld.com/javaworld/jw-08-1996/jw-08-gc_p.html.

* cited by examiner

*Primary Examiner*—Reginald G Bragdon
*Assistant Examiner*—Mehdi Namazi
(74) *Attorney, Agent, or Firm*—Caven & Aghevli LLC

(57) ABSTRACT

Techniques are described herein that may be used to de-fragment a first region of memory. For example, de-fragmenting may include identifying multiple accessed memory locations in the first memory region; and copying the accessed memory locations using the data mover logic in a continuous order to a second memory region.

22 Claims, 5 Drawing Sheets

TECHNIQUES TO TRANSFER INFORMATION BETWEEN MEMORY REGIONS

FIELD

The subject matter disclosed herein relates to techniques to transfer information from a first region to a second region of memory.

RELATED ART

Fragmentation involves information in a region of memory being stored in a non-congruous manner. For example, a fragmented region of memory may include at least one non-accessed portion of memory being interspersed among accessed portions of memory. A non-accessed portion of memory may be a portion of memory that is not written to or read from by any active code segment. De-fragmentation techniques may be used to arrange accessed portions of memory so that no non-accessed regions of memory are interspersed among accessed portions of memory.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
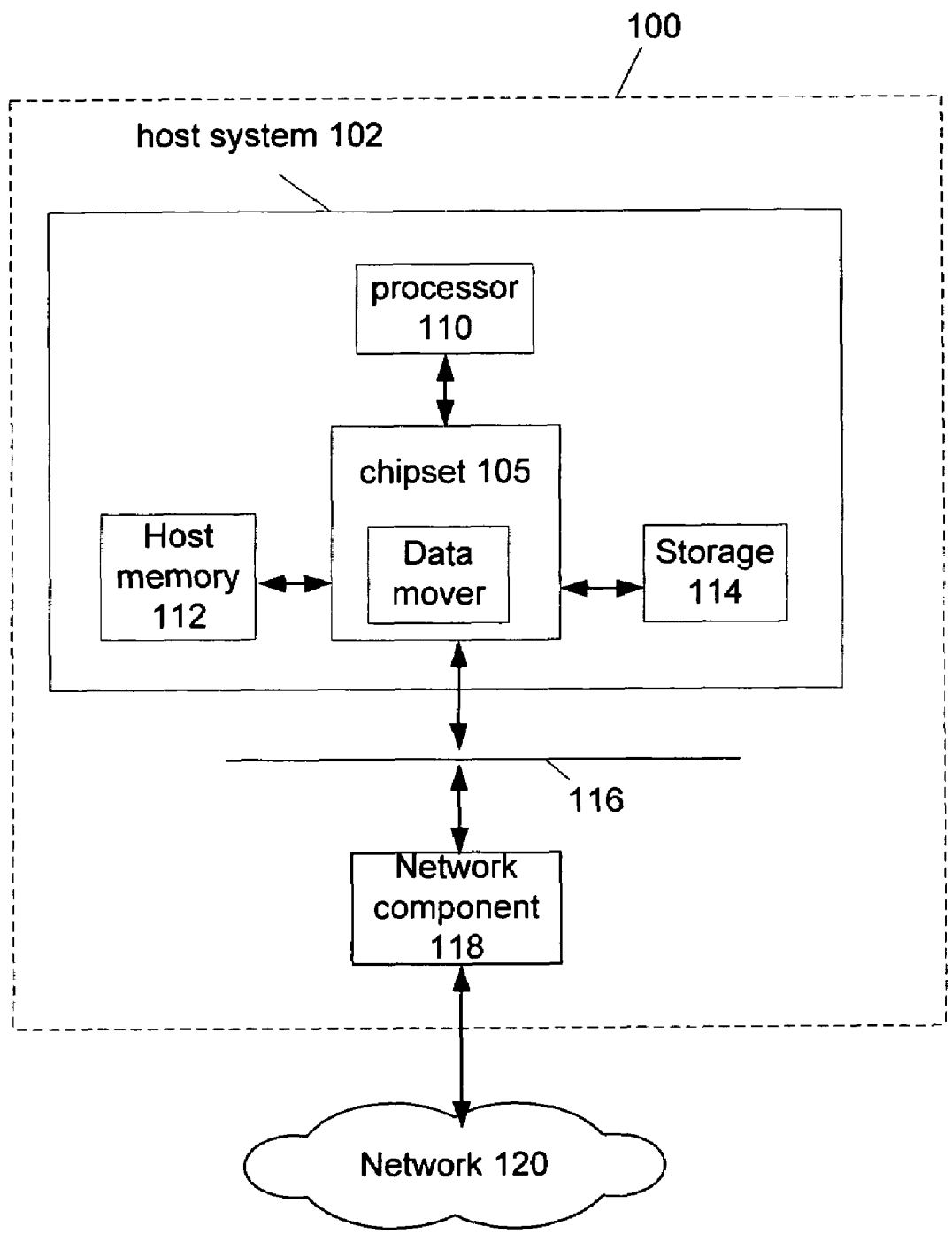
FIG. 1 depicts an example system embodiment in accordance with some embodiments of the present invention.

FIG. 1 depicts in computer system 100 a suitable system in which some embodiments of the present invention may be used. Computer system 100 may include host system 102, bus 116, and network component 118.

Host system 102 may include chipset 105, processor 110, host memory 112, and storage 114. Chipset 105 may provide intercommunication among processor 110, host memory 112, storage 114, bus 116, as well as a graphics adapter that can be used for transmission of graphics and information for display on a display device (both not depicted). For example, chipset 105 may include a storage adapter (not depicted) capable of providing intercommunication with storage 114. For example, the storage adapter may be capable of communicating with storage 114 at least in conformance with any of the following protocols: Small Computer Systems Interface (SCSI), Fibre Channel (FC), and/or Serial Advanced Technology Attachment (S-ATA).

In some embodiments, chipset 105 may include data mover logic capable to perform transfers of information within host system 102 or between host system 102 and network component 118. As used herein, a "data mover" refers to a module for moving data from a source to a destination without using the core processing module of a host processor, such as processor 110, or otherwise does not use cycles of a processor to perform data copy or move operations. By using the data mover to transfer data, the processor may be freed from the overhead of performing data movements, which may result in the host processor running at much slower memory speeds compared to the core processing module speeds. A data mover may include, for example, a direct memory access (DMA) engine as described herein. In some embodiments, data mover could be implemented as part of processor 110, although other components of computer system 100 may include the data mover.

Processor 110 may be implemented as Complex Instruction Set Computer (CISC) or Reduced Instruction Set Computer (RISC) processors, multi-core, or any other microprocessor or central processing unit. Host memory 112 may be implemented as a volatile memory device such as but not limited to a Random Access Memory (RAM), Dynamic Random Access Memory (DRAM), or Static RAM (SRAM). Storage 114 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Bus 116 may provide intercommunication among at least host system 102 and network component 118 as well as other peripheral devices (not depicted). Bus 116 may support serial or parallel communications. Bus 116 may support node-to-node or node-to-multi-node communications. Bus 116 may be compatible at least with Peripheral Component Interconnect (PCI) described for example at Peripheral Component Interconnect (PCI) Local Bus Specification, Revision 2.2, Dec. 18, 1998 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.0a, Jul. 24, 2000, available from the aforesaid PCI Special Interest Group, Portland, Oreg., U.S.A. (as well as revisions thereof); and/or Universal Serial Bus (USB) (and related standards) as well as other interconnection standards.

Network component 118 may be capable of providing intercommunication between host system 102 and network 120 in compliance at least with any applicable protocols. Network component 118 may intercommunicate with host system 102 using bus 116. In one embodiment, network component 118 may be integrated into chipset 105. "Network component" may include any combination of digital and/or analog hardware and/or software on an I/O (input/output) subsystem that may process one or more packets to be transmitted and/or received over a network. In one embodiment, the I/O subsystem may include, for example, a network component card (NIC), and network component may include, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

In some embodiments, data mover logic may be used to de-fragment a region of memory. For example, in response to a request to de-fragment a region of memory, the data mover logic may copy accessed information from a first region of memory and store the copied information to a second region of memory without any unaccessed information interspersed among such accessed information. Accessed information may include information capable of being read by or written to by any logic such as but not limited to a currently executed program or code segment. Accordingly, a processor may be freed to perform tasks other than de-fragmentation. By using the data mover for transfer of data, the processor may be freed from performing data movements, which may result in the host processor running at much slower memory speeds compared to the core processing module speeds.

In some embodiments, data mover logic may be used in connection with transfer of a portion of a network protocol unit from a network component to a memory in the host. As used herein, a "network protocol unit" may include any packet or frame or other format of information with a header and payload portions formed in accordance with any protocol specification. For example, U.S. Patent Publication No. 2005/0223128, inventor Vasudevan et al, filed Mar. 31, 2004, describes a suitable technique for use to process received network protocol units. For example, an indication on a network component may be provided that one or more packets have been received from a network; the network component may notify a TCP-A (transport control protocol-accelerated) driver or other logic that the one or more packets have arrived; the TCP-A driver or other logic may perform packet processing for at least one of the one or more packets; and the TCP-A driver may perform one or more operations that result in the data mover logic placing one or more corresponding payloads of the at least one of the one or more packets into a read buffer in the host.

Network 120 may be any network such as the Internet, an intranet, a local area network (LAN), storage area network (SAN), a wide area network (WAN), or wireless network. Network 120 may exchange traffic with network component 118 using the Ethernet standard (described in IEEE 802.3 and related standards) or any communications standard.

Figure 2:
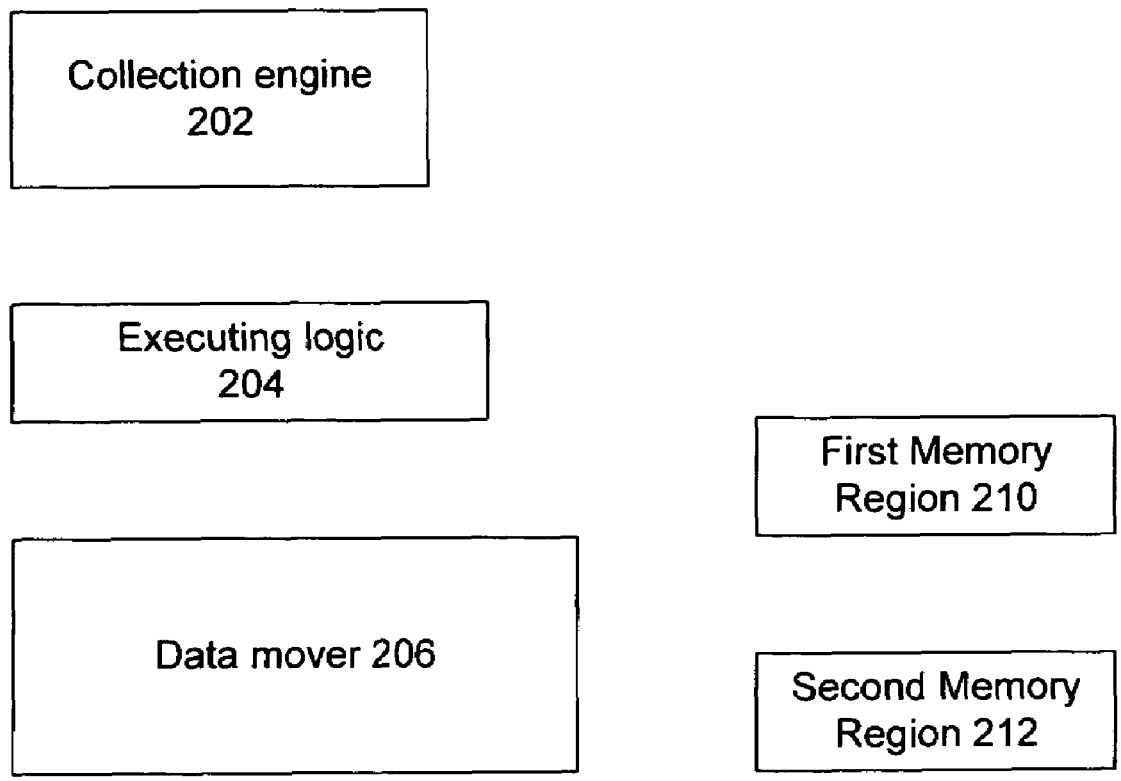
FIG. 2 depicts an example of elements that can be used in some embodiments of the present invention.

FIG. 2 depicts an example of elements that can be used in some embodiments of the present invention. Collection engine 202 may issue a request to de-fragment one or more region of memory. For example, collection engine 202 may issue a request to data mover 206 to copy accessed areas of memory and to store the accessed areas of memory in a continuous order without any non-accessed information stored among the accessed areas. For example, collection engine 202 may be utilized by a virtual machine environment such as but not limited to a Java Virtual Machine (JVM) or .NET Common Language Runtime (CLR) or by a memory manager, or other logic.

In some embodiments, the request from collection engine 202 may include a list of operations to perform. To request de-fragmentation of a region of memory, the request may include one or more copy operations, where each copy operation may include a start address, length of region to copy, destination to copy the region, and an indication whether data mover 206 is to inform collection engine 202 following completion of the operation. In some embodiments, following a last copy operation in a list, data mover 206 may inform collection engine 202 that a copy operation is complete. Collection engine 202 may accept such informing as operations in the entire list being complete.

Executing logic 204 may be any logic capable at least to read from or write to the accessed areas of memory. For example, executing logic 204 may be a code segment executed by a central processing unit such as an application program.

Data mover 206 may be logic capable to copy information from a source to a destination without using the core processing module of a host processor, such as but not limited to processor 110, or otherwise does not use cycles of a processor to perform data copy or move operations. Data mover 206 may include a queue capable to store instructions. For example, the source may include first memory region 210 whereas the destination may include second memory region 212. In accordance with some embodiments of the present invention, data mover 206 may be capable to de-fragment at least some of accessed information in first memory region 210. In other embodiments, non-accessed or other types of information may be copied from first memory region 210 to second memory region 212.

First memory region 210 may be one or more region in memory that at least stores information that are read from or written to by at least one logic such as but not limited to executing logic 204. For example, accessed information may be fragmented within first memory region 210. For example, first memory region 210 may store accessed information that are not stored in consecutive memory locations.

Second memory region 212 may be one or more region in memory at least capable to store information. For example, information from first memory region 210 may be stored into second memory region 212 in connection with reducing an amount of non-accessed information stored between accessed information. For example, accessed information may be stored in second memory region 212 in a manner so that non-accessed information is not interspersed among the accessed information or accessed information may be otherwise stored in consecutive storage locations.

Figure 3:
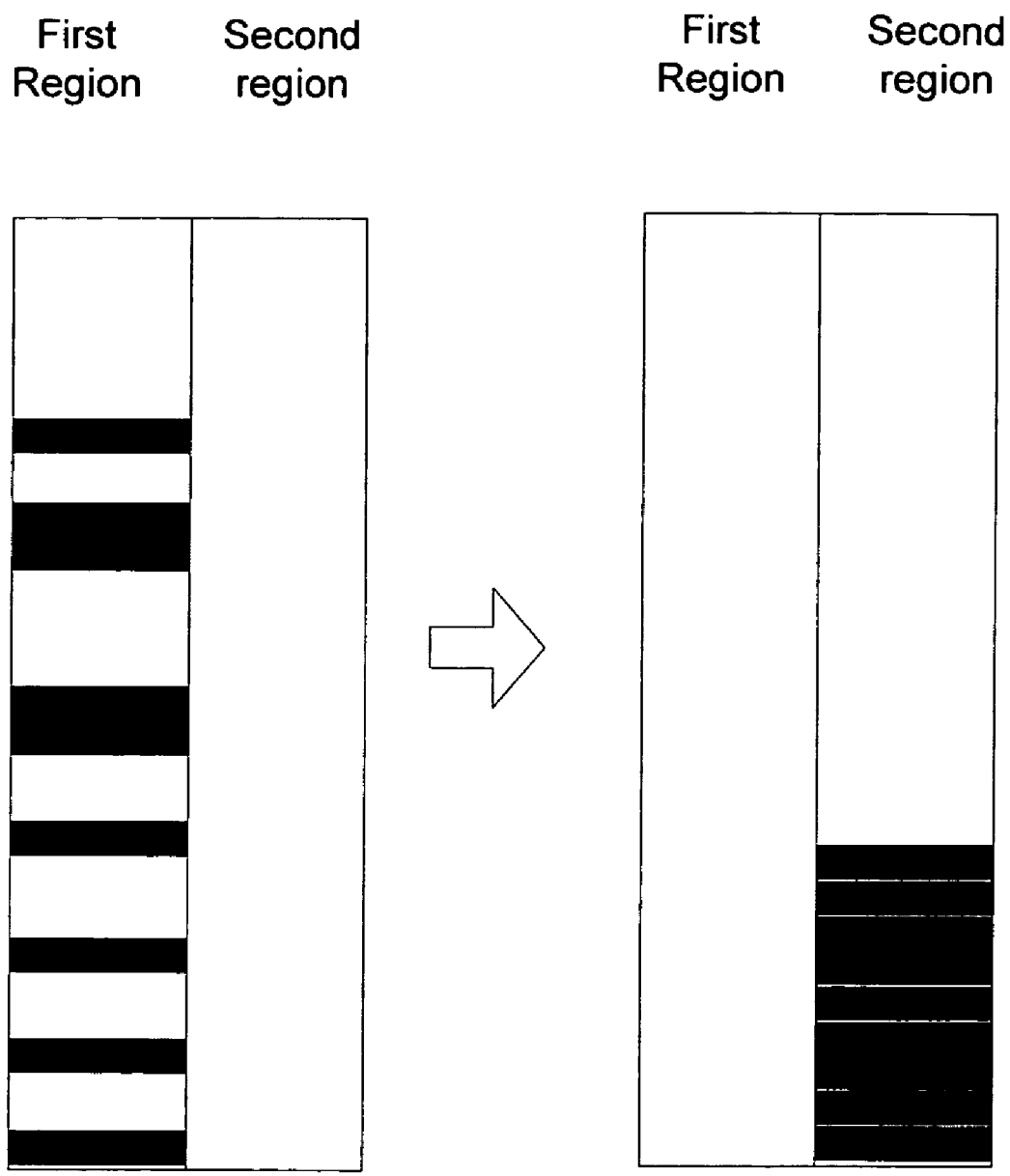
FIG. 3 depicts an example of movement of fragmented accessed information from a first region to a second region, in accordance with some embodiments of the present invention.

FIG. 3 depicts an example of movement of fragmented accessed information from a first region to a second region, in accordance with some embodiments of the present invention. In FIG. 3, each black region represents accessed information. As shown, multiple accessed information in the first region are stored in non-continuous memory locations. The second region may include a region that is available to be overwritten. The multiple accessed information from the first region are copied to the region in the second region that is available to be overwritten in continuous locations.

Figure 4:
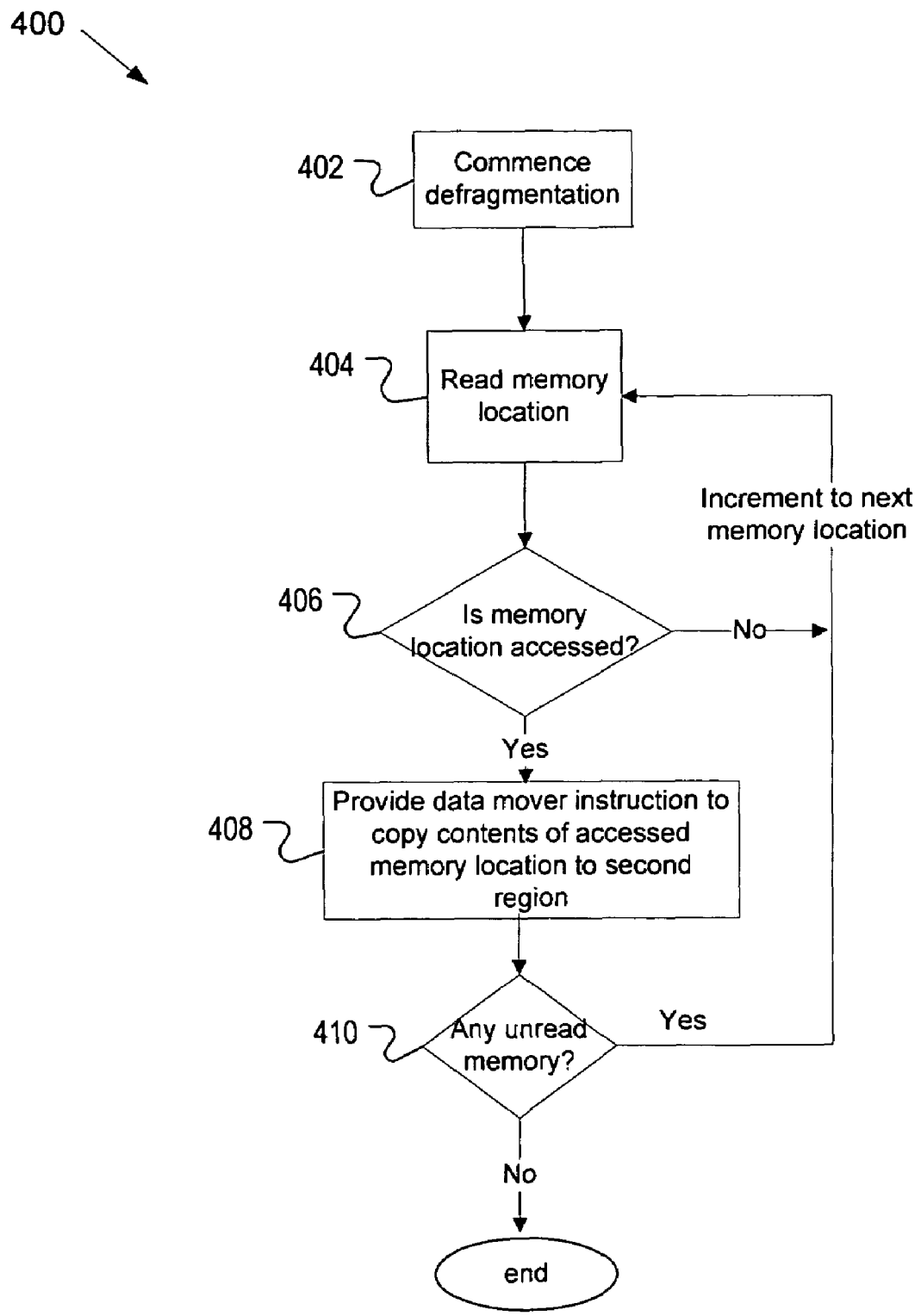
FIGS. 4 and 5 depict example flow diagrams that can be used to de-fragment a region of memory in accordance with some embodiments of the present invention.

FIG. 4 depicts an example flow diagram that can be used to identify contents of a first region of memory that are to be de-fragmented, in accordance with some embodiments of the present invention. Referring to FIG. 4, block 402 may include commencing de-fragmentation on the first region of memory. The de-fragmentation may commence in response to a request. The request may be provided at least periodically or in response to fragmentation in the first region of memory being too large. For example, the request may be provided by a collection engine or other logic.

Block 404 may include reading contents of a memory location in a first region. In the first execution of block 404, contents of a beginning of a region of memory may be read. For example, a collection engine may read contents of a memory region. In some embodiments, a central processing unit may be used to read contents of the memory region.

Block 406 may include determining whether the contents of the memory location are accessed. For example, an accessed memory location may be a memory location in which a currently active logic reads from or writes to the memory location. If the contents of the memory location are unaccessed, then the next addressable memory location may be accessed by performing block 404 on the next memory location. If the contents of the memory location are accessed, then block 408 may follow block 406.

Block 408 may include providing an instruction to the data mover logic to copy the accessed memory location to a second region. For example, the instruction may be provided to an instruction queue of the data mover logic. The data mover logic may perform the instructions in a first-stored-first-performed manner. Contents may be copied by the data mover logic to the second region in order of increasing memory address values.

Block 410 may include determining whether contents of any more memory locations are to be read. If contents of any more memory locations in a first region are to be read, performance of block 404 may follow on a next consecutive memory address location. If no other memory address location in a first region is to be read, process 400 may end.

Figure 5:
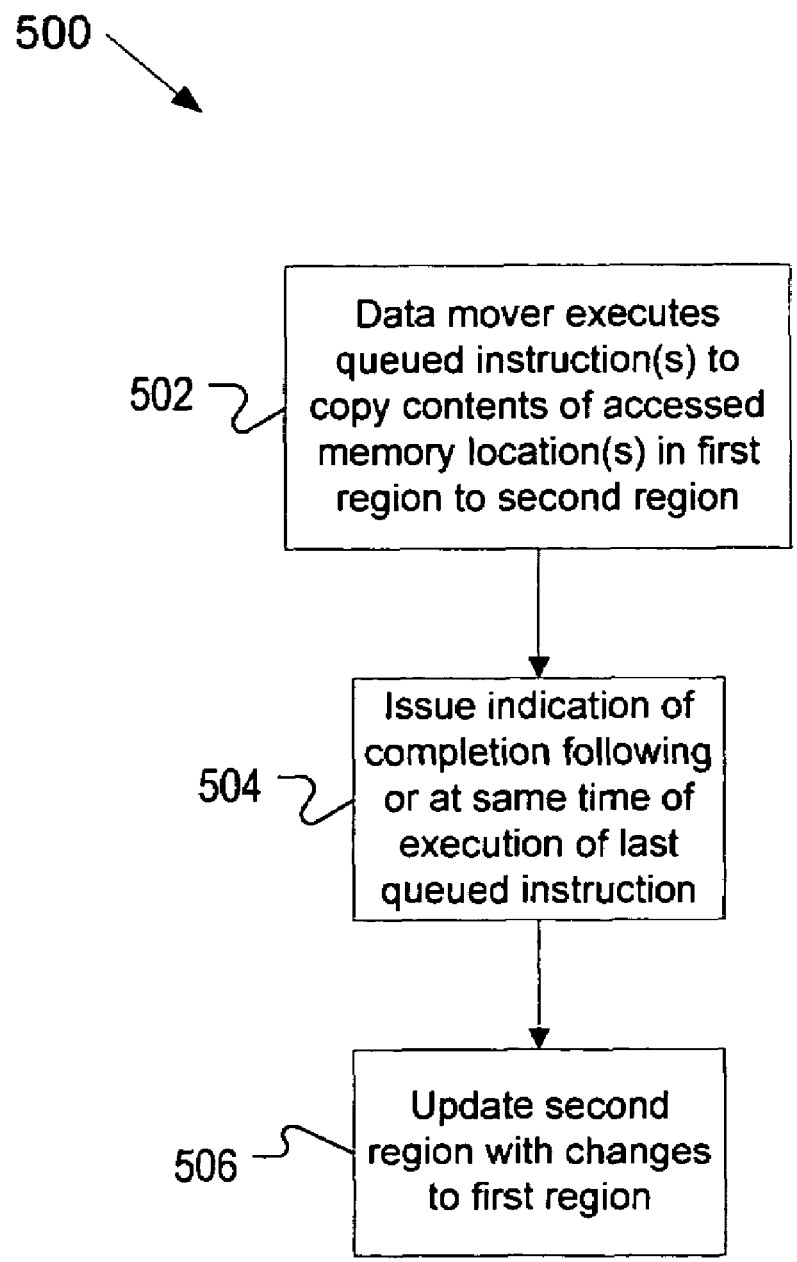

FIG. 5 depicts a process 500 that may execute after an instruction is provided to the data mover logic to copy content of a first region of memory to a second region, in accordance with some embodiments of the present invention. For example, process 500 may be performed by the data mover logic in response to block 408 (FIG. 4) providing an instruction to the data mover logic to copy contents of at least one accessed memory location in a first region to a second region.

During performance of process 500, executing code may access information from the first region until the data mover stores contents of selected accessed memory locations to the second region. For example, in some embodiments, after the data mover logic transfers contents of all accessed memory locations in a first region to the second region, the executing code may then access contents from the second region instead of from the first region.

Block 502 may include the data mover executing the queued instruction to copy contents of an accessed memory location into a second region. The data mover may store content to the second region in continuous order.

Block 504 may include the data mover logic issuing an indication of completion of de-fragmentation following or at the same time of execution of a last queued instruction to copy content to the second region. For example, the last queued instruction may correspond to an instruction to copy the last accessed content in a first region to the second region in connection with a de-fragmentation of the first region.

Block 506 may include updating the second region with changes to the first region that occurred after any portion of the first region was copied by the data mover logic. For example, if any addition of accessed information or change of accessed information occurred in the first region, such addition or change may take place in the second region. For example, the logic that initiated de-fragmentation may keep track of any changes to the first region that occurred after the data mover copied any information from the first region. For example, information added to the first region may be copied to the second region by use of the data mover or a central processing unit. For example, information added to the first region may be added to the second region while preserving an order that information is stored in the first region. For example, information in the first region that changed may be changed in the second region by copying changed information from the first region to overwrite an older version of such information in the second region by use of the data mover or a central processing unit.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus comprising:
  a memory comprising a first region and a second region, wherein the first region includes accessed items and wherein the second region includes a region that is available to be overwritten;
  logic to issue a request to de-fragment the first region, wherein the request is to identify items to copy; and
  data mover logic to copy the identified items to the second region in a continuous order, wherein the data mover logic is coupled to a processor and the memory, wherein the data mover logic is to copy the identified items to the second region of the memory without consuming any cycles of the processor.

2. The apparatus of claim 1, wherein the data mover logic is to indicate completion of copying of the accessed items to the second region.

3. The apparatus of claim 1, wherein the data mover logic is to copy a changed accessed item of the first region to the second region.

4. The apparatus of claim 1, wherein the data mover logic is to copy an accessed item added to the first region to the second region.

5. The apparatus of claim 1, wherein the logic to issue a request comprises a memory manager.

6. The apparatus of claim 1, wherein the data mover logic is capable for use to transfer a portion of a network protocol unit from a network component to a memory in a host system.

7. The apparatus of claim 1, wherein the data mover logic is coupled between the processor and the memory.

8. The apparatus of claim 1, further comprising a chipset that comprises the data mover module.

9. A computer-readable medium comprising instructions stored thereon which when executed by a machine cause the machine to:
  issue a request to de-fragment a first region of memory; and
  issue a request to a data mover logic to store identified information of the first region into a second region of memory in a continuous order, wherein the data mover logic is coupled to a processor and the memory, wherein the data mover logic is to store the identified information to the second region without consuming any cycles of the processor.

10. The computer-readable medium of claim 9, wherein the instruction which when executed by a machine causes the machine to issue a request to de-fragment a first region of memory comprises a memory manager.

11. The computer-readable medium of claim 9, wherein the data mover logic is capable for use to transfer a portion of a network protocol unit from a network component to a memory in a host system.

12. A method comprising:
  identifying multiple memory locations in a first memory region; and
  copying identified contents of memory locations using a data mover logic in a continuous order to a second memory region, wherein the data mover logic is coupled to a processor, wherein the data mover logic is to copy the identified contents to the second region without consuming any cycles of the processor.

13. The method of claim 12, further comprising indicating completion of copying of the identified contents to the second region in a continuous order.

14. The method of claim 12, further comprising:
  updating the second memory region with changes to memory locations of the first memory region, wherein the updating comprises copying changed memory locations of the first memory region to the second memory region.

15. The method of claim 12, further comprising:
  updating the second memory region with changes to memory locations of the first memory region, wherein the updating comprises copying contents added to the first memory region to the second memory region.

16. The method of claim 12, wherein the identifying comprises a memory manager identifying multiple memory locations in the first memory region.

17. The method of claim 12, wherein the data mover logic is capable for use to transfer a portion of a network protocol unit from a network component to a memory in a host system.

18. The method of claim 12, further comprising: permitting logic to access the first memory region during the act of copying.

19. A system comprising:
  a display device;
  a host computer comprising:
    a memory comprising a first region and a second region,
    logic to issue a request to de-fragment the first region, wherein the request is to identify items to copy, and
    data mover logic to copy identified items to the second region in a continuous order, wherein the data mover logic is coupled between a host processor and the memory, wherein the data mover logic is to copy the identified items to the second region without consuming any cycles of the host processor; and
  a network component communicatively coupled to the host computer.

20. The system of claim 19, wherein the data mover logic is capable for use to transfer a portion of a network protocol unit from the network component to the memory.

21. The system of claim 19, wherein the data mover logic is to copy a changed identified item of the first region to the second region.

22. The system of claim 19, wherein the data mover logic is to copy an identified item added to the first region to the second region.

* * * * *